United States Patent [19]

Sasaki et al.

[11] Patent Number: 5,093,417
[45] Date of Patent: Mar. 3, 1992

[54] IMPACT-RESISTANT RESIN

[75] Inventors: Isao Sasaki; Naoki Yamamoto; Akira Yanagase; Masakazu Ito, all of Otake, Japan

[73] Assignee: Mitsubishi Rayon Company Ltd., Tokyo, Japan

[21] Appl. No.: 474,403

[22] Filed: Feb. 2, 1990

[30] Foreign Application Priority Data

Feb. 3, 1989 [JP] Japan .............................. 1-23957
Feb. 6, 1989 [JP] Japan .............................. 1-25864

[51] Int. Cl.$^5$ .......................................... C08L 51/08
[52] U.S. Cl. ....................................... 525/63; 525/68; 525/101
[58] Field of Search ............... 525/63, 68, 101, 132, 525/133

[56] References Cited

U.S. PATENT DOCUMENTS

| 4,226,761 | 10/1980 | Cooper et al. | 525/63 |
| 4,448,931 | 5/1984 | Sugio et al. | 525/68 |
| 4,892,900 | 1/1990 | Sasaki et al. | 524/141 |

FOREIGN PATENT DOCUMENTS

| 0048393 | 3/1982 | European Pat. Off. | 525/68 |
| 0048400 | 3/1982 | European Pat. Off. | 525/68 |
| 0048401 | 3/1982 | European Pat. Off. | 525/132 |
| 0199510 | 10/1986 | European Pat. Off. | 525/68 |
| 59-051953 | 3/1984 | Japan | 525/66 |
| 60-223850 | 11/1985 | Japan | 525/132 |
| 61-089240 | 5/1986 | Japan | 525/68 |
| 61-209247 | 9/1986 | Japan | 525/63 |
| 61-235462 | 10/1986 | Japan | 525/63 |

Primary Examiner—John C. Bleutge
Assistant Examiner—R. Dean, Jr.
Attorney, Agent, or Firm—Oblon, Spivak, McClelland, Maier & Neustadt

[57] ABSTRACT

A high-impact resin is prepared from a combination of (A) a polyphenylene ether, (B) a styrene polymer and (C) a rubbery elastomer composition having a particle diameter distribution, determined by the histogram method in units of 0.01 μm, such that at least 80%, based on the number, of particles have a particle diameter of from 0.03 to 9 μm and that the particle diameter distribution has two peak values: one of from 0.1 to 1 μm and another of from 2 to 8 μm. The rubbery elastomer composition is a blend of 50-95 weight % of a rubbery elastomer having a particle diameter distribution such that a peak occurs in the range of 0.1 to 1 μm, with a rubbery elastomer having a particle diameter distribution such that a peak occurs in the range of 2 to 8 μm.

2 Claims, No Drawings

IMPACT-RESISTANT RESIN

BACKGROUND OF THE INVENTION

1. Field of the Invention

The present invention relates to a polyphenylene ether resin composition having an excellent impact resistance.

2. Description of the Related Art

A polyphenylene ether is known as a thermoplastic resin having an excellent heat resistance, mechanical performances and electric characteristics, but has a poor processability and impact resistance and improvement of these properties is desired. For example, as the means for improving the processability of the polyphenylene ether resin, U.S. Pat. No. 3,383,435 has proposed a resin composition comprising a polyphenylene ether resin and a polystyrene resin or rubber-modified polystyrene resin. This resin composition, however, does not have a satisfactory impact resistance. Techniques of specifying particle sizes of a rubbery elastomer phase dispersed in the resin composition for improving this poor impact resistance have been proposed. For example, Japanese Examined Patent Publication No. 51-28659 teaches that, if the size of particles of the dispersed rubbery elastomer phase is in the range of from 0.5 to 2 μm, an improved impact resistance is manifested. Furthermore, for example, in the Encyclopedia of Polymer Science and Technology, Volume 13, page 392, 1970, it is taught that a polystyrene resin gives a molded article having a satisfactory impact resistance if the size of particles of a rubbery elastomer dispersed in the polystyrene resin is in the range of from 2 to 5 μm. In the case of a polyphenylene ether resin, however, even if the average particle size of the dispersed rubbery elastomer is adjusted to 0.5 to 2 μm, the impact resistance is only slightly improved, and a satisfactory molded article cannot be obtained. If the average particle size of the rubbery elastomer phase is greater than 2 μm, the impact resistance is reduced and the molded article cannot be practically used.

SUMMARY OF THE INVENTION

The primary object of the present invention is to provide a polyphenylene ether resin composition having an excellent impact resistance and solvent resistance.

Surprisingly, it has been found that if a rubbery elastomer having a relatively large particle size and a rubbery elastomer having a relatively small particle size are incorporated in combination into a composition comprising a polyphenylene ether resin and a polystyrene resin, the impact resistance is greatly improved and the solvent resistance is also improved.

In accordance with the present invention, there is provided a resin composition comprising (A) a polyphenylene ether, (B) a styrene polymer and (C) a rubbery elastomer composition having a particle diameter distribution, determined by the histogram method in units of 0.01 μm, such that at least 80%, based on the number, of particles have a particle diameter of from 0.03 to 9 μm; said particle diameter distribution having two peak values, one being in the range of from 0.1 to 1 μm and the other being in the range of from 2 to 8 μm, and said rubbery elastomer composition comprising a blend of 50 to 95% by weight, based on the blend, of a rubbery elastomer having a particle diameter distribution such that a peak occurs in the range of from 0.1 to 1 μm, with 50 to 5% by weight, based on the blend, of a rubbery elastomer having a particle diameter distribution such that a peak occurs in the range of from 2 to 8 μm.

DESCRIPTION OF THE PREFERRED EMBODIMENTS

A molded article obtained from the resin composition of the present invention has an excellent impact resistance. This effect is obtained by using a rubbery elastomer having a relatively large particle diameter and a rubber elastomer having a relatively small particle diameter in combination, and if the rubbery elastomer having a large particle diameter is used in a relatively small amount, the effect is especially prominently manifested.

The particle diameter of the rubbery elastomer, referred to herein, is determined as follows. The rubbery elastomer particles are dispersed in a resin and the resin mixture is shaped into an article; or the rubbery elastomer particles are dispersed in a monomer, the monomer mixture is polymerized to obtain a polymer, and the polymer is shaped into an article. An ultra-thin slice is cut from the shaped article and observed by an electron microscope (1,000 to 10,000 magnifications), and the mean value of the long and short diameters of the rubbery elastomer particle determined from the electron micrograph is calculated. It is sufficient if the number of particles to be measured is 1,500 to 4,000.

The polyphenylene ether polymer (A) used in the present invention is a homopolymer or copolymer having a structure represented by the following general formula:

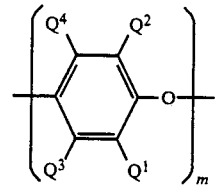

wherein $Q^1$ through $Q^4$ are independently selected from the group consisting of hydrogen and hydrocarbon groups.

As specific examples of the polyphenylene ether, there can be mentioned poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, a copolymer of (2,6-dimethyl-1,4-phenylene)ether and (2,3,6-trimethyl-1,4-phenylene)ether, a copolymer of 1,4-phenylene)ether, and a copolymer of (2,6-dimethyl-1,4-phenylene)ether and (2,3,6-triethyl-1,4-phenylene)ether. Among these, poly(2,6-dimethyl-1,4-phenylene)ether and a copolymer of (2,6-dimethyl-1,4-phenylene)ether and (2,3,6-trimethyl-1,4-phenylene)ether are preferable, and poly(2,6-dimethyl-1,4-phenylene)ether is most preferable. These polyphenylene ethers have a compatibility with a polystyrene resin at any mixing ratio. The degree of polymerization of the polyphenylene ether used in the present invention is not particularly critical, but a polyphenylene ether having a reduced viscosity of 0.3 to 0.7 dl/g as measured at 25° C. in chloroform as the solvent is preferably used. If the reduced viscosity is lower than 0.3 dl/g, the thermal stability is usually lowered. If the reduced viscosity exceeds 0.7 dl/g, the moldability is often reduced. The foregoing polyphenylene ethers can be used alone or in the form of a mixture of two or more thereof.

The styrene polymer (B) used in the present invention is a homopolymer comprising at least 50% by weight of aromatic vinyl monomer units represented by the following formula or a copolymer thereof with other copolymerizable vinyl monomer:

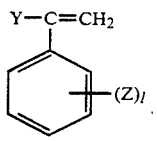

wherein Y represents a hydrogen atom or an alkyl group having 1 to 4 carbon atoms, Z represents a halogen atom or an alkyl group having 1 to 4 carbon atoms, and l is 0 or a number of from 1 to 3.

As specific examples of the styrene polymer, there can be mentioned polystyrene, polychlorostyrene, poly-α-methylstyrene, a styrene/acrylonitrile copolymer, a styrene/methyl methacrylate copolymer, a styrene/maleic anhydride copolymer, a styrene/maleimide copolymer, a styrene/N-phenylmaleimide copolymer, and a styrene/acrylonitrile/α-methylstyrene copolymer. Among these, polystyrene is most preferable.

A styrene polymer having a weight average molecular weight of 150,000 to 500,000 is preferably used. If the weight average molecular weight of the styrene polymer is smaller than 150,000, the solvent resistance is poor, and if the number average molecular weight exceeds 500,000, the moldability is poor.

The rubbery elastomers (C) used in the present invention are natural or synthetic polymeric materials which are elastomeric at room temperature (i.e., 20° to 25° C.). As examples of the rubbery elastomers (C), there can be mentioned a natural rubber, a polymerized diene rubber such as polybutadiene or polyisoprene, and a rubbery copolymer of diene with a vinyl monomer, for example, a vinyl aromatic monomer such as styrene. As preferred examples of the rubbery elastomers, there can be mentioned natural crepe rubber, an SBR type synthetic rubber obtained by the emulsion polymerization of butadiene and styrene, a GR-N type synthetic rubber prepared from butadiene and acrylonitrile, polychlorobutadiene, polyisobutylene, a copolymer of isobutylene with butadiene, a copolymer of ethylene with propylene, a copolymer of ethylene and propylene with a diene, an acrylic rubber, a copolymer of a diene with an ethylenic monomer (for example, an alkyl ester of an unsaturated acid such as an acrylic acid ester), an epichlorohydrin rubber, a silicone rubber, and a composite rubber of a silicone with an ethylenic monomer (for example, an alkyl ester of an unsaturated acid such as an acrylic acid ester).

The rubbery elastomer composition (C) has a particle diameter distribution, determined by the bistogram method in units of 0.01 μm, such that at least 80%, based on the number, of particles have a particle diameter of from 0.03 to 9 μm, and further such that the particle diameter distribution has two peak values, one being in the range of from 0.1 to 1 μm and the other being in the range of from 2 to 8 μm. This rubbery elastomer composition (C) having the specified particle diameter distribution is prepared by blending a rubbery elastomer having a particle diameter distribution such that a peak occurs in the range of from 0.1 to 1 μm, with a rubbery elastomer having a particle diameter distribution such that a peak occurs in the range of from 2 to 8 μm. The proportion of the former elastomer to the latter elastomer is 50/50 to 95/5 by weight. The former elastomer may be the same kind as or different kind from the latter elastomer as long as the respective elastomers satisfy the specified particle diameter distribution requirements.

Polybutadiene and a rubbery copolymer of butadiene and styrene are preferable as the rubbery elastomer (C) having the particle diameter distribution peak in the range of from 2 to 8 μm.

A combination of the styrene polymer (B) with the rubbery elastomers (C), one having a particle diameter peak in the range of 0.1 to 1 μm and the other having a particle diameter peak in the range of 2 to 8 μm, or a combination of the styrene (B) with one of the rubbery elastomers (C) may be in the form of a high impact styrene polymer. This high impact styrene polymer is prepared by mixing the styrene polymer with the rubbery elastomer or elastomers, or by polymerizing styrene in the presence of the rubbery elastomer or elastomers. A high impact styrene polymer obtained by the bulk suspension polymerization in which styrene is polymerized in the presence of a rubber and the resulting grafted elastomer phase is dispersed in a styrene polymer is preferably used. The high impact styrene polymer by the bulk suspension polymerization process is prepared in the following manner.

Polybutadiene is dissolved in monomeric styrene, and this monomeric styrene is polymerized. The amount of the polybutadiene used is 1 to 20% by weight, preferably 2 to 15% by weight, based on the total amount of the monomeric styrene and polybutadiene. The polymerization of the monomeric styrene is carried out in at least two stages. At the first stage, the monomeric styrene containing the polybutadiene dissolved therein is subjected to the initial polymerization in the bulky state under the action of a shearing force. At one or more subsequent stages, the polymerization is carried out in the suspension under a weak shearing force or no shearing force. The initial polymerization at the first stage is generally carried out at a temperature of 50° to 110° C.

The polymerization is initiated by heating or by the action of a free radical-generating initiator. As the free radical-generating initiator, initiators customarily used in this field are used, for example, alkyl peroxides, acyl peroxides, hydrogen peroxide, peresters, peroxide carbonates and azo compounds. An initiator having a grafting activity, for example, benzoyl peroxide, is especially preferred. The concentration of the initiator is 0.001 to 1.0 mole %, preferably 0.005 to 0.5 mole %, based on the styrene monomer. A decomposition promoter can be used in combination with the initiator.

When the amount of the polymerized styrene has reached 1.2 to 2 times of the amount of the polybutadiene, the first stage polymerization is terminated by rapidly cooling the polymerization mixture and then stopping the stirring.

A known water-soluble suspending agent such as methyl cellulose, hydroxypropyl cellulose, polyvinyl alcohol, partially saponified polyvinyl acetate or polyvinyl pyrrolidone and an inorganic dispersant such as barium sulfate are added to the reaction product obtained by the first stage polymerization (these additives are generally, added in amounts of 0.1 to 5% by weight based on the organic layer), and the mixture is suspended in water and the polymerization is completed usually at a temperature of 40° to 160° C. At this step, to adjust the weight average molecular weight of the styrene polymer as the matrix to 150,000 to 500,000, a polymerization initiator can be added in an amount of 0.01 to 0.2% by weight, preferably 0.03 to 0.15% by weight.

The particle diameter of the rubbery elastomer particles in the high impact styrene polymer can be controlled by the shearing force and polymerization temperature in the first stage polymerization. The smaller the shearing force and the lower the polymerization temperature, the larger the particle diameter of the rubbery, elastomer particles. The particle diameter also depends upon the apparatus used, namely, the particle diameter varies depending upon the apparatus even though the shearing force is constant.

The obtained intended product can be mechanically kneaded with a styrene polymer having a weight average molecular weight of 150,000 to 500,000 by an extruder or the like.

A polyorganosiloxane type graft copolymer resin is preferably used as the rubber elastomer having the particle size distribution peak in the range of from 0.1 to 1 μm. As the polyorganosiloxane type graft copolymer resin, there can be mentioned a rubbery elastomer obtained by graft-polymerizing at least one vinyl monomer onto a polyorganosiloxane rubber and a rubbery elastomer obtained by graft-polymerizing at least one vinyl monomer onto a composite rubber comprising a polyorganosiloxane and a poly[alkyl (meth)acrylate] rubber. In this composite rubber, the polyorganosiloxane and poly[alkyl (meth)acrylate] are mutually entangled with each other so that they cannot be substantially separated from each other.

In general, the polyorganosiloxane rubber is obtained in the form of fine particles by the emulsion polymerization of an organosiloxane using a crosslinking agent and a grafting agent. The composite rubber of the polyorganosiloxane rubber and poly[alkyl (meth)acrylate] rubber can be obtained by emulsion-polymerizing an organosiloxane by using a crosslinking agent and, if desirable, a grafting agent to form a polyorganosiloxane rubber component in the form of fine particles, and impregnating the rubber component with an alkyl (meth)acrylate, a crosslinking agent and a grafting agent and carrying out the polymerization.

Preferably, the particle diameter distribution peak of the polyorganosiloxane type graft copolymer is in the range of from 0.1 to 1.0 μm. If the particle diameter distribution peak is smaller than 0.1 μm, the impact resistance of the molded article prepared from the resin composition is poor. If the particle diameter distribution peak exceeds 1 μm, the impact resistance and appearance of the molded article prepared from the resin composition become poor. An emulsion polymerization process is optimum for the preparation of the polyorganosiloxane type graft copolymer having this particle size distribution characteristic.

A cyclic organosiloxane having an at least three-membered ring, preferably 3 to 6 membered ring, is used for the preparation of the polyorganosiloxane rubber. For example, there can be mentioned hexamethylcyclotrisiloxane, octamethylcyclotetrasiloxane, decamethylcyclopentacyloxane, dodecamethylcyclohexasiloxane, trimethyltriphenylcyclotrisiloxane, tetramethyltetraphenylcyclotetrasiloxane and octaphenylcyclotetrasiloxane. These organosiloxanes can be used alone or in the form of a mixture of two or more thereof. The amount cf the organosiloxane used is at least 50% by weight, preferably at least 70% by weight, based on the polyorganosiloxane rubber component.

As the crosslinking agent used for the preparation of the polyorganosiloxane rubber having a cross-linked structure, there can be mentioned trifunctional and tetrafunctional silane such as trimethoxymethylsilane, triethoxyphenylsilane, tetramethoxysilane, tetraethoxysilane, tetra-n-propoxysilane and tetrabutoxysilane. Among these, tetraethoxysilane is especially preferable. The amount of the crosslinking agent used is 0.1 to 30% by weight based on the polyorganosiloxane rubber component.

The term "grafting agent" used herein means a compound which can be a part of the polyorganosiloxane rubber and provides a site onto which a vinyl monomer is grafted. The grafting agent has a functional group which is not reacted in the step of preparing a polyorganosiloxane rubber, but reacted with the vinyl monomer in the step of graft-polymerizing the vinyl monomer onto the polyorganosiloxane rubber. As the grafting agent, there can be used compounds capable of forming units represented by the following formula:

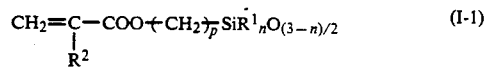  (I-1)

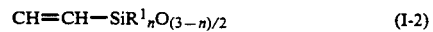  (I-2)

or

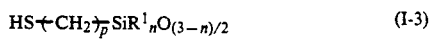  (I-3)

wherein $R^1$ represents a methyl group, are ethyl group, a propyl group or a phenyl group, $R^2$ represents a hydrogen atom or a methyl group, n is 0, 1 or 2, and p is a number of from 1 to 6.

The acryloyloxysiloxane or methacryloyloxysiloxane capable of forming units of formula (I-1) car form an effective graft chain because the grafting efficiency is high, and thus, this compound is advantageous for manifesting the impact resistance. A methacryloyloxysiloxane is especially preferable as the compound capable of forming units represented by formula (I-1). As specific examples of the methacryloyloxysiloxane, there can be mentioned β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γmethacryloyloxypropyldiethoxymethylsilane and δ-methacryloyloxybutyldiethoxymethylsilane. The amount of the grafting agent used is 0.05 to 10% by weight based on the polyorganosiloxane rubber component.

The latex of the polyorganosiloxane rubber component can be prepared, for example, according to the process disclosed in U.S. Pat. No. 2,891,920 or U.S. Pat. No. 3,294,725. In carrying out the present invention, a process is preferably adopted in which a mixed solution of the organosiloxane, the crosslinking agent and the grafting agent is mixed under shearing with water in the presence of a sulfonic acid type emulsifier such as an alkylbenzenesulfonic acid, an alkylsulfonic acid or the like by using, for example, a homogenizer. The alkylbenzenesulfonic acid is especially preferable because it acts not only as the emulsifier for the organopolysiloxane but also as the polymerization initiator. If a metal salt of an alkylbenzenesulfonic acid or a metal salt of an alkylsulfonic acid is used in combination at this step, the polymer latex can be stably maintained at the graft polymerization. The particle diameter of the polyorganosiloxane rubber can be controlled by the pressure applied in the homogenizing step and the number of repeating the homogenization. The higher the pressure and the larger the number of repeat, the smaller the particle diameter.

A vinyl monomer can be graft-polymerized onto the polyorganosiloxane rubber component. Alternatively, a composite rubber of this rubber component and a poly[alkyl (meth)acrylate] rubber component is prepared, and a vinyl monomer is graft-polymerized onto the composite rubber.

The poly[alkyl (meth)acrylate] rubber component constituting the above-mentioned composite rubber can be synthesized by using an alkyl (meth)acrylate described below, a crosslinking agent and a grafting agent.

As the alkyl (meth)acrylate, there can be mentioned, for example, alkyl acrylates such as methyl acrylate, ethyl acrylate, n-propyl acrylate, n-butyl acrylate and 2-ethylhexyl acrylate, and alkyl methacrylates such as hexyl methacrylate, 2-ethylhexyl methacrylate and n-lauryl methacrylate. Use of the n-butyl acrylate is especially preferable.

The crosslinking agent used herein can be a part of the poly[alkyl (meth)acrylate] rubber and forms a crosslinked structure in this rubber. As the crosslinking agent, there can be mentioned, for example, ethylene glycol dimethacrylate, propylene glycol dimethacrylate, 1,3-butylene glycol dimethacrylate and 1,4-butylene glycol dimethacrylate.

The term "grafting agent" used herein means a compound having a functional group which may be partially reacted or not at all reacted in the step of preparing the poly[alkyl (meth)acrylate] rubber, but reacted with a vinyl monomer in the step of graft-polymerizing the vinyl monomer onto the poly[alkyl (meth)acrylate] rubber. Thus, when the vinyl monomer is graft-polymerized onto the composite rubber composed of the poly[alkyl (meth)acrylate] rubber having graft sites derived from this grafting agent and the polyorganosiloxane rubber having graft sites derived from the hereinbefore-mentioned grafting agent, the vinyl monomer is reacted with these two types of graft sites. As the grafting agent, there can be mentioned, for example, alkyl methacrylate, triallyl cyanurate and triallyl isocyanurate. Allyl methacrylate can be used also as the crosslinking agent.

The foregoing crosslinking agent and grafting agent can be used alone or in the form of mixtures of two or more thereof. The sum of the amounts of the used crosslinking agent and grafting agent is 0.1 to 20% by weight based on the poly[alkyl (meth)acrylate] rubber component.

The polymerization of the poly[alkyl (meth)acrylate] rubber component is accomplished by adding the above-mentioned alkyl (meth)acrylate, crosslinking agent and grafting agent to a latex of the polyorganosiloxane rubber component neutralized by addition of an aqueous solution of an alkali such as sodium hydroxide, potassium hydroxide or sodium carbonate, to impregnate the polyorganosiloxane rubber particles with the alkyl (meth)acrylate, crosslinking agent and grafting agent, and causing a usual radical polymerization initiator to react on the latex. With advance of the polymerization, a crosslinked network of the poly[alkyl (meth)acrylate] rubber, which is mutually entangled with the crosslinked network of the polyorganosiloxane rubber, is formed, and a latex of a composite rubber is obtained in which the polyorganosiloxane rubber component and poly[alkyl (meth)acrylate] rubber components are not substantially separated from each other. Among such composite rubbers, there is especially preferably used a composite rubber in which the main skeleton of the polyorganosiloxane rubber component comprises recurring units of dimethylsiloxane and the main skeleton of the poly[alkyl (meth)acrylate] rubber component comprises recurring units of n-butyl acrylate.

The ratio between the polyorganosiloxane, rubber component and poly[alkyl (meth)acrylate] rubber component in the composite rubber is such that the amount of the former component is at least 10% by weight and the amount of the latter component is up to 90% by weight. If the amount of the poly[alkyl (meth)acrylate] rubber component exceeds 90% by weight, the impact resistance is poor.

The polyorganosiloxane rubber thus obtained by the emulsion polymerization or the composite rubber thereof is graft-copolymerizable with a vinyl monomer. As the vinyl monomer to be graft-polymerized, there can be mentioned, for example, aromatic alkenyl compounds such as styrene, α-methylstyrene and vinyltoluene, methacrylic acid esters such as methyl methacrylate and 2-ethylhexyl methacrylate, acrylic acid esters such as methyl acrylate, ethyl acrylate and butyl acrylate, and vinyl cyanide compounds such as acrylonitrile and methacrylonitrile. These monomers can be used alone or in the form of a mixture of two or more thereof. Among these vinyl monomers, an aromatic alkenyl compound is preferable, and styrene is most preferable.

Preferably, the ratio between the rubber component and the vinyl monomer is such that the amount of the former component is 30 to 95% by weight and the amount of the latter component is 5 to 70% by weight. If the amount of the vinyl monomer is smaller than 5% by weight, the dispersibility of the polyorganosiloxane type graft copolymer resin in the resin composition is lowered. If the amount of the vinyl monomer is larger than 70% by weight, the impact resistance is poor.

The rubbery elastomer composition (C) comprises a rubbery elastomer having a particle diameter distribution peak in the range of from 0.1 to 1 μm and a rubbery elastomer having a particle diameter distribution peak in the range of from 2 to 8 μm. The amount of the rubbery elastomer composition and the proportion of the rubbery elastomers have a close relationship to the impact resistance performance. Namely, the proportion of the rubbery elastomer having the particle diameter distribution peak in the range of from 0.1 to 1 μm and the rubbery elastomer having the particle diameter distribution peak in the range of from 2 to 8 μm are preferably 50 to 95% by weight, and 50 to 5% by weight, respectively, based on the entire rubbery elastomer composition. If the proportion of the latter rubbery elastomer exceeds 50% by weight, the impact resistance is poor and good results cannot be obtained.

Preferably, the amount of the entire rubbery elastomer composition (C) to be added in the present invention is 1 to 30% by weight based on the entire resin composition. If the amount of the rubbery elastomer composition is smaller than 1% by weight, the effect of manifesting the impact resistance is insufficient, and if the amount of the rubbery elastomer is larger than 30% by weight, the strength of the resin composition is poor and the resulting molded article cannot be practically used.

Based on the total amount of the polyphenylene ether polymer (A), styrene polymer (B) and rubbery elastomer (C), the amount of the polyphenylene ether polymer (A) is 10 to 80% by weight, preferably 25 to 60% by weight, and the amount of the styrene polymer (B) is 5 to 80% by weight, preferably 10 to 60% by weight. If the amount of the polyphenylene ether polymer is too small, the heat resistance, mechanical performance and electric characteristics of this polymer are not utilized. If the amount of the styrene polymer (B) is too small, the moldability is poor. If the amounts of these resin components are too large, the impact resistance is poor.

The resin composition of the present invention is prepared by mechanically mixing the respective components by a known apparatus such as a Banbury mixer, a roll mill or a twin-screw extruder and pelletizing the mixture.

A stabilizer, a plasticizer, a lubricant, a flame retardant, a pigment, a filler and the like can be added to the resin composition of the present invention according to need. As such additives, there can be mentioned stabilizers such as triphenyl phosphite, lubricants such as polyethylene wax and polypropylene wax, phosphate type flame retardants such as triphenyl phosphate and tricresyl phosphate, bromine the flame retardants such as decabromobiphenyl and decabromobiphenyl ether, pigments such as titanium oxide, zinc sulfide and zinc oxide, and fillers such as glass fiber, asbestos, wollastonite, mica and talc.

The resin composition of the present invention will now be described in detail with reference to the following examples. In the example, all of "parts" and "%" are by weight unless otherwise indicated.

The particle diameters of the polyorganosiloxane rubber, the polyorganosiloxane composite rubber, and the rubber in the high impact polystyrene were determined as follows. The polyorganosiloxane rubber particles or polyorganosiloxane composite rubber particles were dispersed in a resin and the resin mixture was shaped into an article. The high impact polystyrene containing rubber particles was shaped into an article. A ultra-thin slice was cut from each of the shaped articles and observed by an electron microscope (1,000 to 10,000 magnifications), and the mean value of the long and short diameters of 1,500 to 4,000 rubber particles determined from the electron micrograph was calculated.

The physical properties of the obtained samples were measured according to the following methods.

Izod impact strength:

The Izod impact strength was measured according to the method of ASTM 256 (¼" mold notched).

Solvent resistance:

The kerosene resistance was measured by the cantilever method. Namely, a test piece having a length of 6", a width of ½" and a thickness of ⅛" was supported at three points so that the maximum stress was 200 kg/cm². Kerosene was coated on the surface of the test piece on the side to be elongated, and the time required for breaking of the test piece was measured. When this time is at least 7 hours, it is judged that the test piece can be put to practical use.

Flame retardancy:

The flame retardancy was determined according to the vertical combustion test method of UL-94V.

REFERENTIAL EXAMPLE 1

Preparation of high impact polystyrenes (HS-1 through HS-6)

To monomeric styrene containing a predetermined amount of polybutadiene having a molecular weight of 180,000 and a 1,2-vinyl content of 10% was added 0.088% by mole based on styrene of benzoyl peroxide, and the initial polymerization was carried out with stirring at a predetermined temperature in a reaction vessel until the conversion of monomeric styrene became about 35%.

Then a predetermined amount (shown in Table 1) of dicumyl peroxide was dissolved in the polymer solution, and water containing 0.064% by weight of sodium carboxymethylcellulose was added in an amount three times the amount of the polymer solution to suspend the polymer solution in water. Then a reaction was carried out with stirring at 120° C. for 5 hours and at 140° C. for 5 hours.

The weight average molecular weight of the matrix was measured by GPC after extracting the soluble component from the obtained high impact polystyrene with methyl ethyl ketone. Simultaneously, the gel content was measured.

The particle diameter of the elastomer phase obtained from the polybutadiene was measured and shown in Table 1.

The properties of the high impact polystyrenes prepared under various conditions are shown in Table 1.

TABLE I

| | Polybutadiene (%) | Reaction temperature (°C.) | Agitation speed (rpm) | Amount of dicumyl peroxide (%) | Peak particle diameter (μm) | Weight average molecular weight (× 10⁴) | Gel content (%) |
| --- | --- | --- | --- | --- | --- | --- | --- |
| HS-1 | 3 | 80 | 150 | 0.05 | 3.9 | 36 | 7 |
| HS-2 | 7 | 80 | 150 | 0.05 | 4.1 | 35 | 17 |
| HS-3 | 7 | 140 | 150 | 0.05 | 0.8 | 35 | 16 |
| HS-4 | 7 | 80 | 150 | 0.15 | 4.2 | 20 | 16 |
| HS-5 | 7 | 80 | 150 | 0.1 | 4.0 | 23 | 16 |
| HS-6 | 7 | 80 | 150 | 0.02 | 4.1 | 45 | 18 |

REFERENTIAL EXAMPLE 2

Preparation of polyorganosiloxane graft copolymer (S-1)

By mixing 2 parts of tetraethoxysilane, 0.5 part of γ-methacryloyloxypropyldimethoxymethylsilane and 97.5 parts of octamethylcyclotetrasiloxane, 100 parts of a mixture was obtained. A solution of 1 part of sodium dodecyl benzenesulfonate and 1 part of dodecyl benzenesufonic acid in 200 parts of distilled water was added to 100 parts of the above-mentioned siloxane mixture, and the mixture was preliminarily stirred at 10,000 rpm by a homomixer. Then, the mixture was emulsified under a pressure of 300 kg/cm² by a homogenizer to obtain an organosiloxane latex. This latex was transferred into a separable flask equipped with a condenser and stirring vanes, and the latex was heated with stirring at 80° C. for 5 hours and allowed to stand at 20° C. for 48 hours. The latex was neutralized to a pH value of 6.9 by an aqueous solution of sodium hydroxide to complete the polymerization and obtain polyorganosiloxane rubber latex 1. The polymerization conversion of the obtained polyorganosiloxane rubber was 89.7%, and the number average particle diameter of the polyorganosiloxane rubber was 0.16 μm.

A separable flask equipped with a stirrer was charged with 234.1 parts (solid content=30%) of the obtained polyorganosiloxane latex 1, 60 parts of distilled water was added into the flask, and the atmosphere was replaced by nitrogen. Then the temperature was elevated to 60° C. and a liquid mixture comprising 0.002 part of ferrous sulfate, 0.006 part of disodium ethylenediaminetetraacetate, 0.26 part of Rongalit and 5 parts of distilled water was charged into the flask. Then a liquid mixture comprising 0.1 part of cumene hydroperoxide and 30 parts of styrene was added dropwise over a period of 30 minutes. Then the mixture was maintained at 70° C. for 3 hours to complete the polymerization of styrene. The conversion of styrene was 92.1%. The obtained graft copolymer latex was dropped into 300 parts of hot water containing 1.5% by weight of calcium chloride to effect coagulation and separation. The product was dried at 80° C. for 20 hours to obtain 96.4 parts of a dry powder of a polyorganosiloxane graft copolymer (hereinafter referred to as "S-1"). When the dry powder was extracted with toluene, it was found that the gel content was 85%. The polyorganosiloxane rubber thus-swelled with polystyrene in the dry powder of the graft copolymer exhibited a particle diameter distribution such that a peak value in the number of particles occurs at a particle diameter of 0.22 μm.

REFERENTIAL EXAMPLE 3

Preparation of polyorganosiloxane graft copolymer (S-2)

A separable flask equipped with a stirrer was charged with 293 parts of the polyorganosiloxane rubber latex 1 obtained in the course of the preparation of the polyorganosiloxane graft copolymer (S-1), and 102 parts of distilled water was added and the atmosphere was replaced by nitrogen. The temperature was elevated to 65° C. and a liquid mixture comprising 0.002 part of ferrous sulfate, 0.006 part of disodium ethylenediaminetetraacetate, 0.26 part of Rongalit and 5 parts of distilled water was charged into the flask. The, a liquid mixture comprising 0.12 part of tert.-butyl-hydroperoxide and 15 parts of methyl methacrylate was added dropwise to the latex at 65° C. over a period of 15 minutes. Then the mixture was maintained at 65° C. for 4 hours to complete the graft polymerization onto the polyorganosiloxane rubber. The conversion of methyl methacrylate was 99.5%. The obtained graft copolymer latex was dropped into 400 parts of hot water containing 1.5% by weight of calcium chloride to effect coagulation and separation. The obtained product was washed and dried at 75° C. for 16 hours to obtain 97.0 part of a dry powder of a polyorganosiloxane graft copolymer (hereinafter referred to as "S-2"). The gel content was 93%. The polyorganosiloxane rubber thus-swelled with polystyrene in the dry powder of the graft-copolymer exhibited a particle diameter distribution such that a peak value in the number of particles occurs at a particle diameter of 0.21 μm.

REFERENTIAL EXAMPLE 4

Preparation of polyorganosiloxane composite rubber graft copolymer (S-3)

A separable flask equipped with a stirrer was charged with 100 parts (solid content=30%) of the polyorganosiloxane rubber latex 1 obtained in the course of the preparation of the polyorganosiloxane graft copolymer (S-1), and 120 parts of distilled water was added to the flask and the atmosphere was replaced by nitrogen. The temperature was elevated to 50° C. and a liquid mixture comprising 37.5 parts of n-butyl acrylate, 2.5 parts of allyl methacrylate and 0.3 part of tert.-butyl hydroperoxide was charged into the flask. Then the mixture was stirred for 30 minutes to permeate the liquid mixture into the polyorganosiloxane rubber particles. Then a liquid mixture comprising 0.0003 part of ferrous sulfate, 0.001 part of disodium ethylenediamine tetraacetate, 0.17 part of Rongalit and 3 parts of distilled water was charged into the flask to initiate the radical polymerization. Then the inner temperature was maintained at 70° C. for 2 hours to complete the polymerization and obtain a silicone/acrylic composite rubber latex. A part of the latex was collected and the average particle diameter of the composite rubber was measured. It was found to be 0.19 μm. The latex was dried to obtain a solid, and the solid was extracted at 90° C. for 12 hours with toluene and the gel content was measured. It was found to be 90.3%. Then a liquid mixture comprising 0.3 part of tert.-butyl hydroperoxide and 30 parts of styrene was added dropwise to the composite rubber latex at 70° C. over a period of 45° C. Then the mixture was maintained at 70° C. for 4 hours to complete the graft polymerization onto the composite rubber.

The obtained graft copolymer exhibited a polymerization conversion of 98.6% and a gel content of 75%. The obtained graft copolymer latex was dropped into hot water containing 5% of calcium chloride to effect coagulation and separation. The separated solid was washed and dried at 75° C. for 16 hours to obtain a silicone/acrylic composite rubber graft copolymer. The polyorganosiloxane composite rubber thus-swelled with polystyrene in the dry powder of the graft copolymer exhibited a particle diameter distribution such that a peak value in the number of particles occurs at a particle diameter of 0.33 μm.

REFERENTIAL EXAMPLE 5

Preparation of polyorganosiloxane composite rubber graft copolymer (S-4)

A separable flask equipped with a stirrer was charged with 117 parts of the polyorganosiloxane rubber latex 1 obtained in the course of the preparation of the polyorganosiloxane graft copolymer (S-1), and 57.5 parts of distilled water was added into the flask and the atmosphere was replaced by nitrogen. The temperature was elevated to 60° C., and a liquid mixture comprising 49 parts of n-butyl acrylate, 1.0 part of allyl methacrylate and 0.26 part of tert.-butyl hydroperoxide was charged into the flask and the mixture was stirred for 30 minutes to permeate the liquid mixture into the polyorganosiloxane rubber particles. Then a liquid mixture comprising 0.002 part of ferrous sulfate, 0.006 part of disodium ethylenediaminetetraacetate, 0.26 part of Rongalit and 5 parts of distilled water was charged into the flask to initiate the radical polymerization. The inner temperature was maintained 70° C. for 2 hours to complete the polymerization and obtain a composite rubber latex. A part of the latex was collected and the average particle diameter of the composite rubber was measured. It was found to be 0.19 μm. The latex was dried to obtain a solid, and the solid was extracted at 90° C. for 12 hours with toluene and the gel content was measured. It was found to be 97.3% by weight. Then a liquid mixture comprising 0.12 part of tert.-butyl hydroperoxide and 15 parts of methyl methacrylate was added dropwise to the composite rubber latex at 70° C. for 15 minutes. Then the mixture was maintained at 70° C. for 4 hours to complete the graft copolymerization onto the composite rubber. The conversion of methyl methacrylate was 99.5%. The obtained graft copolymer latex was dropped into 200 parts of hot water containing 1.5% by weight of calcium chloride to effect coagulation and separation. The separated solid was washed and dried at 75° C. for 16 hours to obtain 96.5 parts of a dry powder of a composite rubber graft copolymer (hereinafter referred to as "S-4"). The gel content was 92%. The polyorganosiloxane composite rubber thus-swelled with polymethyl methacrylate in the dry powder of the graft copolymer exhibited a particle diameter distribution such that a peak value in the number of particles occurs at a particle diameter of 0.32 μm.

EXAMPLES 1 THROUGH 3 AND COMPARATIVE EXAMPLE 1

Resin components shown in Table 2 were melt-kneaded at a cylinder temperature of 270° C. by using a twin-screw extruder (Model ZSK-30 supplied by Werner & Pfleiderer) and pelletized. The obtained pellet was dried and molded into a test piece at a cylinder temperature of 260° to 280° C. and a mold temperature of 70° C. by using an injection molding machine (Bromat Injection Molding Machine supplied by Sumitomo Heavy Industries). Note, in the subsequent examples and comparative examples, test pieces were obtained in the above-mentioned manner.

The impact strength and solvent resistance characteristics of the obtained test pieces are shown in Table 2.

TABLE 2

|  | Example 1 | Example 2 | Example 3 | Comparative Example 1 |
|---|---|---|---|---|
| Resin Compositions (parts) | | | | |
| Polyphenylene ether*[1] | 40 | 40 | 40 | 40 |
| High impact polystyrene | | | | |
| HS-2 | 10 (1.7)*[3] | 5 (0.85) | 20 (3.4) | 25 (4.25) |
| HS-3 | 50 (8.0) | 55 (8.8) | 40 (6.4) | 35 (5.6) |
| Proportion of rubber particles of 0.03–9 μm(%)*[2] | 86 | 83 | 96 | 97 |
| Characteristics | | | | |
| Izod impact strength (¼", notched) (kg · cm/cm) | 19 | 21 | 18 | 7 |
| Solvent resistance (cantilever) (hours) | 9 | 8 | 20 | 24< |

Note
*[1] poly(2,6-dimethyl-1,4-phenylene)ether having a reduce viscosity of 0.49 dl/g (25° C. in chloroform)
*[2] Proportion of rubber particles having diameters falling within the range of from 0.03 to 9 μm
*[3] each parenthesized value was the amount (% by weight) of the rubbery elastomer in the high impact polystyrene based on resin composition As is apparent from the results shown in Table 2, if the high impact polystyrene (HS-2) having a peak particle diameter of 4.1 μm and the high impact polystyrene (HS-3) having a peak particle diameter of 0.8 μm are used in combination for the elastomer phase, the impact resistance is prominently improved. If the proportion of the high impact polystyrene (HS-2) increases and exceeds 50% based on the entire rubber (Comparative Example 1), the manifestation of the impact resistance is reduced.

EXAMPLES 4 THROUGH 6 AND COMPARATIVE EXAMPLES 2 AND 3

Test pieces were prepared and tested in the same manner as described in Examples 1 through 3 except that the resin composition was changed as shown in Table 3, that is, the polyorganosiloxane graft copolymer (S-1) and polystyrene having a weight average molecular weight of 230,000 were used instead of the high impact polystyrene (HS-3). The results are shown in Table 3.

As apparent from the results shown in Table 3, if the high impact polystyrene having a particle diameter distribution peak value of 4.1 μm is used in combination with the polyorganosiloxane graft copolymer (S-1), excellent impact resistance and excellent solvent resistance are obtained.

TABLE 3

|  | Example No. | | | Comparative Example No. | |
|---|---|---|---|---|---|
|  | 4 | 5 | 6 | 2 | 3 |
| Resin Compositions (parts) | | | | | |
| Polyphenylene ether*[1] | 40 | 40 | 40 | 40 | 40 |
| Polyorganosiloxane graft copolymer S-1 | 10 (8.5)*[4] | 9 (7.7) | 8 (6.8) | 5 (4.25) | 3 (2.9) |
| High impact polystyrene HS-2 | 7 (1.2) | 15 (2.6) | 20 (3.4) | 30 (5.1) | 41 (7.0) |
| Polystyrene*[2] | 43 | 36 | 32 | 25 | 16 |
| Proportion of rubber particles of 0.03–9 μm (%)*[3] | 88 | 89 | 91 | 93 | 96 |
| Characteristics | | | | | |
| Izod impact strength (¼", notched) (kg · cm/cm) | 15 | 16 | 15 | 12 | 11 |
| Solvent resistance (cantilever) (hours) | 7 | 9 | 10 | 20 | 24< |

Note
*[1] poly(2,6-dimethyl-4-phenylene)ether having a reduced viscosity of 0.49 dl/g (25° C. in chloroform)
*[2] S-Bright 7 supplied by Nippon Polystyrene
*[3] Proportion of rubber particles having diameters falling within the range of from 0.03 to 9 μm
*[4] each parenthesize value was the amount of the rubber elastomer in the polyorganosiloxane graft copolymer or high impact polystyrene (% by weight based on resin composition)

EXAMPLES 7 THROUGH 9 AND COMPARATIVE EXAMPLES 4 AND 5

Test pieces were prepared and tested in the same manner as described in Examples 1 through 3 except that the resin composition was changed as shown in Table 4. The results are shown in Table 4.

TABLE 4

|  | Example 7 | Example 8 | Example 9 | Comparative Example 4 | Comparative Example 5 |
|---|---|---|---|---|---|
| Resin Compositions (parts) |  |  |  |  |  |
| Polyphenyl ether*1 | 40 | 40 | 40 | 40 | 40 |
| Polyorganosiloxane graft copolymer S-1 | 15 (12.8) | 15 (12.8) | 15 (12.8) | — | 15 (12.8) |
| High impact polystyrene HS-1 | 45 | — | — | — | — |
| High impact polystyrene HS-2 | — | 25 (4.3) | 45 (7.7) | — | — |
| High impact polystyrene HS-3 | — | — | — | 60 (9.6) | 45 (7.2) |
| Polystyrene*2 | — | 20 | — | — | — |
| Proportion of rubber particles of 0.03–9 μm (%)*3 | 81 | 82 | 85 | 71 | 84 |
| Characteristics |  |  |  |  |  |
| Izod impact strength (⅛", notched) (kg · cm/cm) | 17 | 22 | 19 | 9 | 17 |
| Solvent resistance (cantilever) (hours) | >24 | 19 | >24 | 1 | 6 |

Note
*1 poly(2,6-dimethyl-1,4-phenylene)ether having a reduced viscosity of 0.49 dl/g (25° C. in chloroform)
*2 S-Bright 7 supplied by Nippon Polystyrene
*3 Proportion of rubber particles having diameters falling within the range of from 0.03 to 9 μm As is apparent from the results shown in Table 4, if only the high impact polystyrene (HS-3) is incorporated into the polyphenylene ether (A) (Comparative Example 4), the impact resistance and solvent resistance are poor, but if the polyorganosiloxane graft copolymer is further incorporated (Examples 7 through 9), the impact resistance and solvent resistance are highly improved. Moreover, where the number average particle diameter of the polybutadiene elastomer phase in the high impact polystyrene resin is large (Examples 7 and 9), the solvent resistance is higher than where this number average particle diameter is small (Example 10).

EXAMPLE 10 THROUGH 13

Test pieces were prepared and tested in the same manner as described in Examples 1 through 3 except that the resin composition was changed as shown in Table 5 (high impact polystyrenes HS-4, HS-5 and HS-6 different in the molecular weight of the matrix polystyrene were used in Examples 10, 11 and 12, respectively, and the polyorganosiloxane graft copolymer S-2 was used instead of S-1 in Example 13). The results are shown in Table 5.

TABLE 5

|  | Example 10 | Example 11 | Example 12 | Example 13 |
|---|---|---|---|---|
| Resin Compositions (parts) |  |  |  |  |
| Polyphenylene ether*1 | 40 | 40 | 40 | 40 |
| Polyorganosiloxane graft copolymer S-1 | 15 (7.5) | 15 (7.5) | 15 (7.5) | — |
| Polyorganosiloxane graft copolymer S-2 | — | — | — | 15 (12.8) |
| High impact polystyrene HS-4 | 45 (7.2) | — | — | — |
| High impact polystyrene HS-5 | — | 45 (7.2) | — | — |
| High impact polystyrene HS-6 | — | — | 45 (8.1) | — |
| High impact polystyrene HS-2 | — | — | — | 45 (7.7) |
| Proportion of rubber particles of 0.03–9 μm (%)*2 | 83 | 83 | 85 | 85 |
| Characteristics |  |  |  |  |
| Izod impact strength (⅛", notched) (kg · cm/cm) | 17 | 17 | 20 | 19 |
| Solvent resistance (cantilever) (hours) | 9 | 16 | >24 | >24 |

Note
*1 poly(2,6-dimethyl-1,4-phenylene)ether having a reduced viscosity of 0.49 dl/g (25° C. in chloroform)
*2 Proportion of rubber particles having diameters falling within the range of from 0.03 to 9 μm

EXAMPLES 14, 15 AND 16

Test pieces were prepared and tested in the same manner as described in Examples 4 through 7 except that the resin composition was changed as shown in Table 6 (various additives were added). The results are shown in Table 6.

TABLE 6

|  | Example 14 | Example 15 | Example 16 |
|---|---|---|---|
| Resin Compositions (parts) |  |  |  |
| Polyphenylene ether*1 | 50 | 30 | 35 |
| Polyorganosiloxane graft copolymer S-1 | 10 (8.5) | 10 (8.5) | 7 (6.0) |
| High impact polystyrene HS-2 | 36 (6.1) | 14 (2.4) | 30 (5.1) |
| polystyrene*2 | — | 40 | — |
| Flame-retardant plasticizer*3 | 4 | 5 | 7 |
| White carbon*4 | 1 | 1 | 1 |
| Glass fiber*5 | — | — | 20 |
| Proportion of rubber particles of 0.03–9 μm (%)*7 | 94 | 88 | 97 |
| Characteristics |  |  |  |
| Izod impact strength (⅛", notched) (kg · cm/cm) | 15 | 13 | 10 |
| Solvent resistance (cantilever) (hours) | >24 | 11 | >24 |
| Flame retardancy*6 | V-1 | V-1 | V-1 |

Note
*1 poly(2,6-diethyl-1,4-phenylene)ether having a reduced viscosity of 0.49 dl/g (25° C. in chloroform)
*2 S-Bright 7 supplied by Nippon Polystyrene
*3 triphenyl phosphate
*4 Aerosil R972 supplied by Tsuchiya Kaolin, containing 99.8% of silicon dioxide
*5 ECSO 3T-828 supplied by Denki Glass
*6 determined according to UL-94, sample thickness = 16"
*7 Proportion of rubber particles having diameters falling within the range of from 0.03 to 9 μm

EXAMPLES 17 THROUGH 19 AND COMPARATIVE EXAMPLE 6

Test pieces were prepared and tested in the same manner as described in Examples 1 through 3 except that the resin composition was changed as shown in Table 7 (the polyorganosiloxane composite rubber copolymer S-3 was used instead of the polyorganosiloxane graft copolymer). The results are shown in Table 7.

TABLE 7

| | Example 17 | Example 18 | Example 19 | Comparative Example 4 | Comparative Example 6 |
|---|---|---|---|---|---|
| Resin Composition (parts) | | | | | |
| Polyphenylene ether*1 | 40 | 40 | 40 | 40 | 40 |
| Polyorganosiloxane composite rubber graft copolymer S-3 | 15 (11.3) | 15 (11.3) | 15 (11.3) | — | 15 (11.3) |
| High impact polystyrene HS-1 | 45 (3.2) | — | — | — | — |
| High impact polystyrene HS-2 | — | 25 (4.3) | 45 (7.7) | — | — |
| High impact polystyrene HS-3 | — | — | — | 60 (9.6) | 45 (7.2) |
| Polystyrene*2 | — | 20 | — | — | — |
| Proportion of rubber particles of 0.03–9 μm (%)*3 | 81 | 82 | 86 | 71 | 84 |
| Characteristics | | | | | |
| Izod impact strength (¼", notched) (kg · cm/cm) | 24 | 25 | 26 | 9 | 25 |
| Solvent resistant (cantilever) (hours) | >24 | 19 | >24 | 1 | 6 |

Note
*1 polyphenylene ether having a reduced viscosity of 0.49 dl/g (25° C. in chloroform)
*2 S-Bright 7 supplied by Nippon Polystyrene
*3 Proportion of rubber particles having diameters falling within the range of from 0.03 to 9 μm As apparent from the results shown in Table 7, if only the high impact polystyrene (HS-3) is incorporated (Comparative Example 4), the impact resistance and solvent resistance are poor, but if the polyorganosiloxane composite rubber graft copolymer is further incorporated (Examples 17 through 19), both of the impact resistance and solvent resistance are prominently improved.

EXAMPLES 20, 21 AND 22 AND COMPARATIVE EXAMPLES 7 AND 8

Test pieces were prepared and tested in the same manner as described in Examples 1 through 3 except that the resin composition was changed as shown in Table 8. The results are shown in Table 8.

As seen from the results shown in Table 8, if the high impact polystyrene in which the peak value of the particle diameter distribution of the rubbery elastomer phase is 4.1 μm is incorporated in combination with the polyorganosiloxane composite rubber graft copolymer (S-3), an excellent impact resistance and solvent resistance can be obtained.

TABLE 8

| | Example 20 | Example 21 | Example 22 | Comparative Example 7 | Comparative Example 8 |
|---|---|---|---|---|---|
| Resin Compositions (parts) | | | | | |
| Polyphenylene ether*1 | 40 | 40 | 40 | 40 | 40 |
| Polyorganosiloxane composite rubber graft copolymer S-3 | 12 (9)*3 | 10 (7.5) | 9 (6.8) | 5 (3.75) | 4 (3.0) |
| High impact polystyrene HS-2 | 7 (1.2) | 15 (2.6) | 20 (3.4) | 37 (5.27) | 41 (7.0) |
| Polystyrene*2 | 41 | 35 | 31 | 24 | 15 |
| Proportion of rubber particles of 0.03–9 μm (%)*4 | 88 | 89 | 91 | 93 | 95 |
| Characteristics | | | | | |
| Izod impact strength (¼", notched) (kg · cm/cm) | 18 | 17 | 17 | 11 | 10 |
| Solvent resistance (cantilever) (hours) | 8 | 9 | 9 | 22 | 24< |

Note
*1 poly(2,6-dimethyl-1,4-phenylene)ether having a reduced viscosity of 0.49 dl/g (25° C. in chloroform)
*2 S-Bright 7 supplied by Nippon Polystyrene
*3 Each value indicates the amount of the rubber elastomer in the polyorganosiloxane composite rubber graft copolymer or high impact polystyrene (% by weight based on the resin composition)
*4 Proportion of rubber particles having diameters falling within the range of from 0.03 to 9 μm

EXAMPLES 23 THROUGH 26

Test pieces were prepared and tested in the same manner as described in Examples 17 through 19 except that the resin composition was changed as shown in Table 9 (in Examples 23, 24 and 25, the high impact polystyrenes HS-4, HS-5 and HS-6 differing in the molecular weight were used, respectively, as the matrix polystyrene, and in Example 26, the polyorganosiloxane composite rubber graft copolymer S-4 was used instead of S-3). The results are shown in Table 9.

TABLE 9

| | Example No. | | | |
|---|---|---|---|---|
| | 23 | 24 | 25 | 26 |
| Resin Composition (parts) | | | | |
| Polyphenylene ether*1 | 40 | 40 | 40 | 40 |
| Polyorganosiloxane composite rubber graft copolymer S-3 | 15 (11.3) | 15 (11.3) | 15 (11.3) | — |
| Polyorganosiloxane composite rubber graft copolymer S-4 | — | — | — | 15 (13.8) |
| High impact polystyrene HS-4 | 45 (7.2) | — | — | — |
| High impact polystyrene HS-5 | — | 45 (7.2) | — | — |
| High impact polystyrene HS-6 | — | — | 45 (8.1) | — |
| High impact polystyrene HS-2 | — | — | — | 45 (7.7) |
| Proportion of rubber particles of 0.03–9 μm (%)*2 | 84 | 83 | 85 | 85 |
| Characteristics | | | | |
| Izod impact strength (¼", notched) (kg · cm/cm) | 19 | 20 | 22 | 21 |
| Solvent resistance (cantilever) (hours) | 9 | 16 | >24 | >24 |

Note
*1 poly(2,6-dimethyl-1,4-phenylene)ether having a reduced viscosity of 0.49 dl/g (25° C. in chloroform)
*2 Proportion of rubber particles having diameters falling within the range of from 0.03 to 9 μm

EXAMPLES 27, 28 AND 29

Test pieces were prepared and tested in the same manner as described in Examples 17 through 19 except that the resin composition was changed as shown in Table 10 (various additives were added). The results are shown in Table 10.

TABLE 10

|  | Example 27 | Example 28 | Example 29 |
|---|---|---|---|
| Resin Composition (parts) | | | |
| Polyphenylene ether*¹ | 50 | 30 | 35 |
| Polyorganosiloxane composite rubber graft copolymer S-3 | 10 (7.5) | 10 (7.5) | 7 (5.3) |
| High impact polystyrene HS-2 | 36 (6.1) | 14 (2.4) | 30 (5.1) |
| Polystyrene*² | — | 40 | — |
| Flame-retardant plasticizer*³ | 4 | 5 | 7 |
| White carbon*⁴ | 1 | 1 | 1 |
| Glass fiber*⁵ | — | — | 20 |
| Proportion of rubber particles of 0.03-9 μm (%)*⁷ | 93 | 88 | 98 |
| Characteristics | | | |
| Izod impact strength (¼", notched) (kg · cm/cm) | 17 | 14 | 10 |
| Solvent resistance (cantilever) (hours) | >24 | 10 | >24 |
| Flame retardancy*⁶ | V-1 | V-1 | V-1 |

Note
*¹poly(2,6-dimethyl-1,4-phenylene)ether having a reduced viscosity of 0.49 dl/g (25° C. in chloroform)
*²S-Bright 7 supplied by Nippon Polystyrene
*³triphenyl phosphate
*⁴Aerosil R972 supplied by Tsuchiya Kaolin, containing 99.8% of silicon dioxide
*⁵ECSO 3T-828 supplied by Denki Glass
*⁶determined according to UL-94, sample thickness = 16"
*⁷Proportion of rubber particles having diameters falling within the range of from 0.03 to 9 μm

We claim:

1. A resin composition comprising (A) a polyphenylene ether, (B) a styrene polymer selected from the group consisting of polystyrene, polychlorostyrene, poly-α-methylstyrene, styrene/acrylonitrile copolymer, styrene/methyl methacrylate copolymer, styrene/maleic anhydride copolymer, styrene/maleimide copolymer, styrene/N-phenylmaleimide copolymer and styrene/acrylonitrile/α-methylstyrene copolymer, and (C) a rubbery elastomer composition having a particle diameter distribution, determined by the histogram method in units of 0.01 μm, such that at least 80%, based on the number, of particles have a particle diameter of from 0.03 to 9 μm, said particle diameter distribution having two peak values, one being in the range of from 0.1 to 1 μm and the other being in the range of from 2 to 8 μm, and said rubbery elastomer composition comprising a blend of 50% to 95% by weight, based on the blend of a rubbery elastomer having a particle diameter distribution such that a peak occurs in the range of from 0.1 to 1 μm, with 50 to 5% by weight, based on the blend, of a rubbery elastomer having a particle diameter distribution such that a peak occurs in the range of from 2 to 8 μm, wherein the rubbery elastomer having the particle diameter distribution peak in the range of 0.1 to 1 μm is a polyorganosiloxane graft copolymer formed by graft-polymerizing a vinyl monomer onto a polyorganosiloxane rubber or onto a composite rubber comprising a polyorganosiloxane rubber entangled with a polyalkyl-methacrylate rubber or a polyalkyl-acrylate rubber.

2. A resin composition according to claim 1, wherein the polyorganosiloxane rubber, onto which a vinyl monomer is to be graft-polymerized, is prepared by emulsion-polymerizing an organosiloxane in the presence of a crosslinking agent and a grafting agent; and the composite rubber, onto which a vinyl monomer is to be graft-polymerized, is prepared by emulsion-polymerizing an organosiloxane in the presence of a crosslinking agent and a grafting agent to obtain a polyorganosiloxane rubber, impregnating the thus-obtained polyorganosiloxane rubber with a methacrylate or acrylate, and then polymerizing the methacrylate or acrylate.

* * * * *